United States Patent [19]

Van Horn, II

[11] Patent Number: 4,598,634
[45] Date of Patent: Jul. 8, 1986

[54] BROILER/GRIDDLE

[75] Inventor: William E. Van Horn, II, Upland, Calif.

[73] Assignee: CCI Industries, Rancho Cucamonga, Calif.

[21] Appl. No.: 693,573

[22] Filed: Jan. 22, 1985

[51] Int. Cl.$^4$ .............................................. A47J 37/06
[52] U.S. Cl. ........................................ 99/340; 99/400; 99/425; 99/445; 99/446; 99/450
[58] Field of Search ................ 99/340, 445, 446, 414, 99/400, 450, 425; 426/523

[56] References Cited

U.S. PATENT DOCUMENTS

| | | | |
|---|---|---|---|
| 2,940,381 | 6/1960 | Cottongim | 99/445 |
| 3,008,406 | 11/1961 | Reeves | 99/340 X |
| 3,369,481 | 2/1968 | Pappas | 99/446 X |

FOREIGN PATENT DOCUMENTS

| | | | |
|---|---|---|---|
| 129109 | 9/1948 | Australia | 99/445 |
| 459764 | 1/1937 | United Kingdom | 99/446 |

OTHER PUBLICATIONS

European Pat. No. 0 099 551, 2-1984, Henke.

Primary Examiner—Billy J. Wilhite
Attorney, Agent, or Firm—Knobbe, Martens, Olson & Bear

[57] ABSTRACT

A portable broiler and griddle apparatus which is placed on top of the burners on a cooking range to convert the range interchangeably into a broiler for flame broiling or a griddle for frying. The apparatus comprises a three-sided fire box within which rests interchangeably a broiling grid or a griddle on which the food is cooked. When the grid is in place for broiling, a removable base unit is placed underneath it to catch a substantial portion of the grease dripping from the broiling food. Both the grid and base have openings throughout which are staggered to allow a small portion of grease to drip down and ultimately reach the burners, to impart a charbroiled flavor to the food. The griddle, grid, and base are positioned at an angle to drain off grease into a removably attached grease cup at the front of the fire box.

6 Claims, 6 Drawing Figures

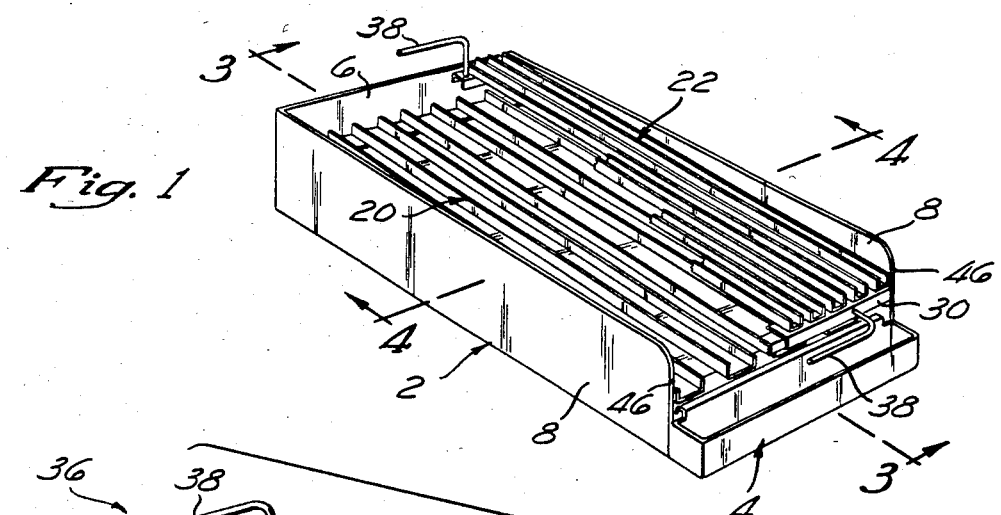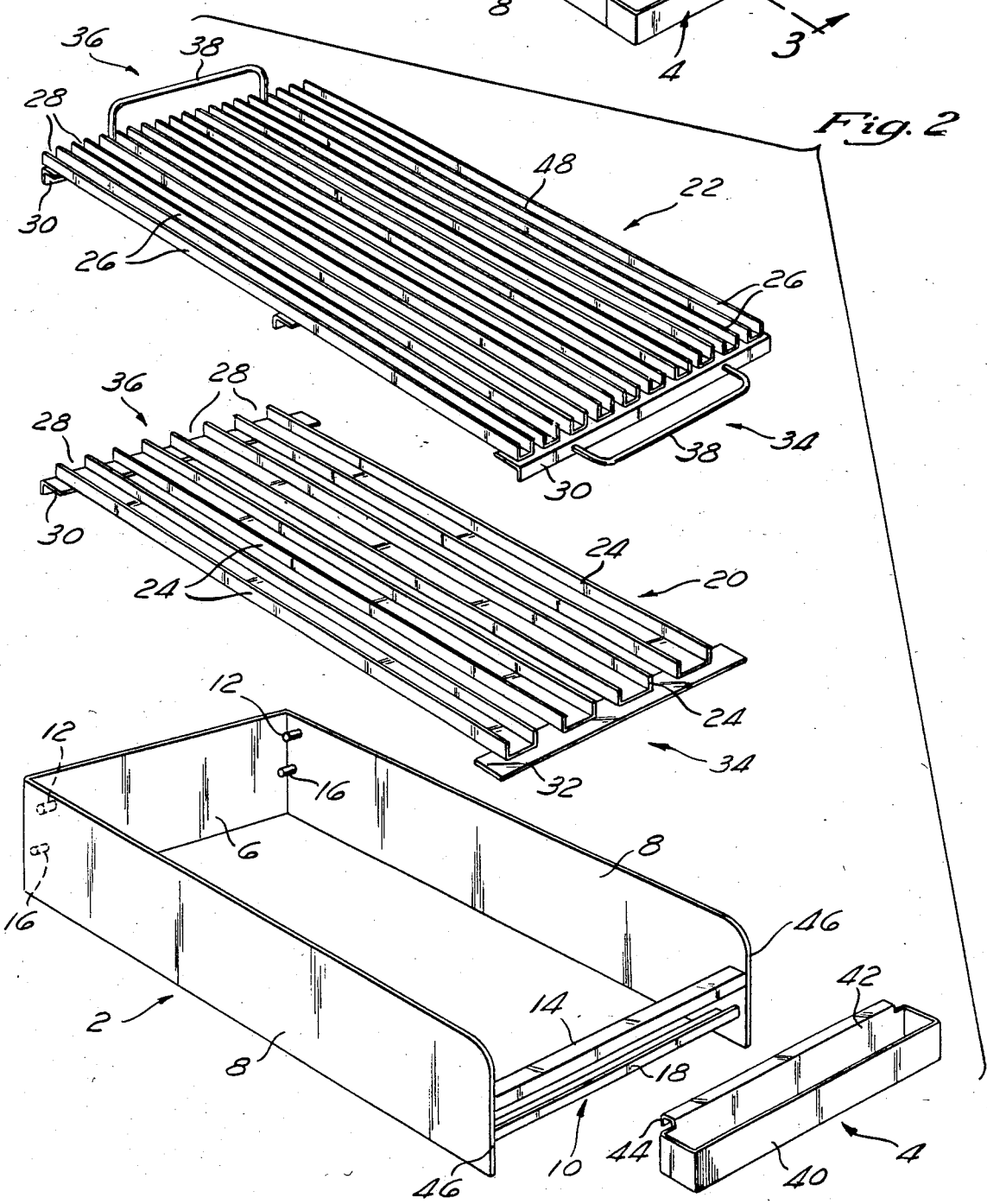

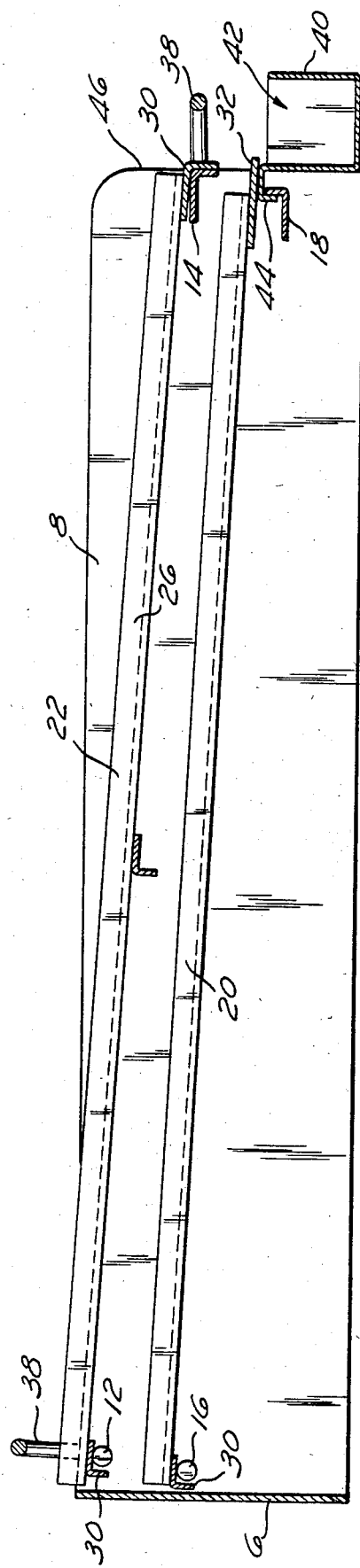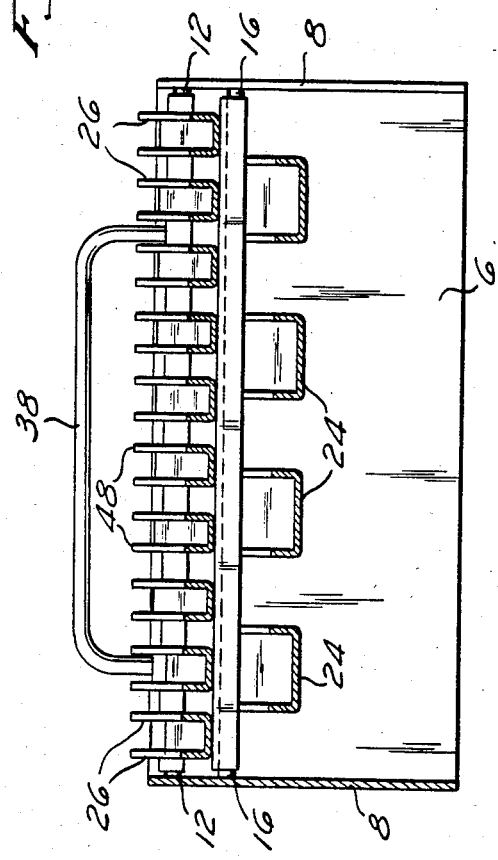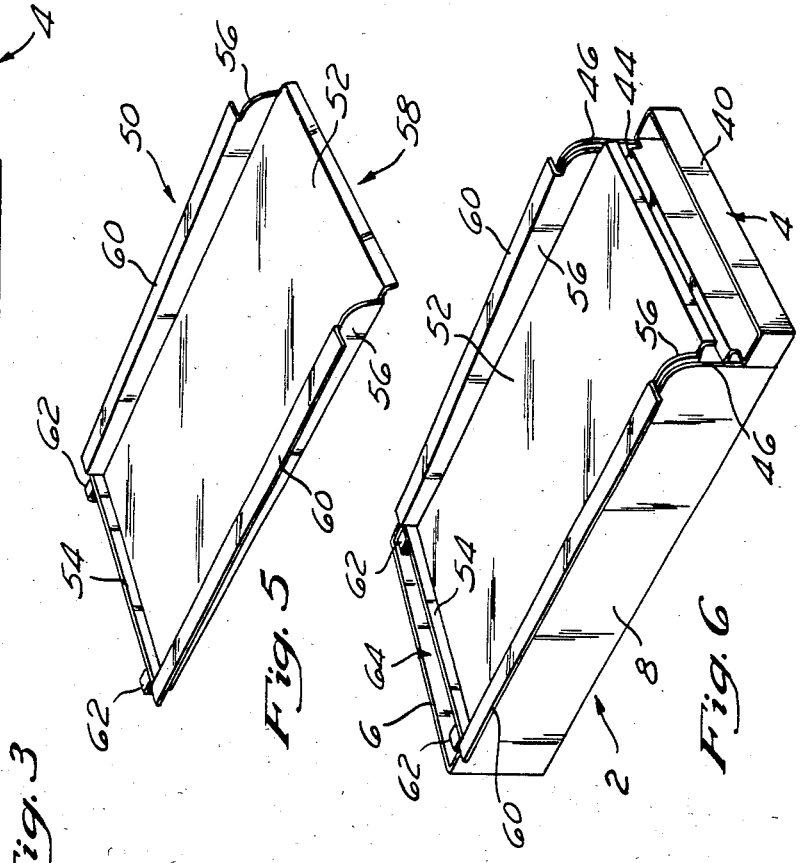

BROILER/GRIDDLE

BACKGROUND OF THE INVENTION

This invention relates generally to portable broilers and griddles, and particularly to an interchangeable broiler/griddle apparatus which is placed on top of a cooking range to quickly adapt the burners of the range into a grill for broiling food or a griddle for frying food.

In most institutional and commercial kitchens, it is desirable to have the capacity to be able to both fry and flame broil large quantities of food at a high rate. In large scale kitchens, these operations are accomplished at dedicated cooking stations, which can only serve one purpose. For example, food is fried on a large, flat metal griddle which is heated from underneath by a heat source, such as a gas burner. Likewise, broiling takes place on a broiler or grill, which consists of a broiling grid suspended a short distance above a gas burner. The grid typically allows liquid grease from the food item being cooked to drip down onto the burner, imparting to the food a charbroiled flavor as the dripping grease is ignited by the burner's flame, as on an outdoor barbecue.

Grills and griddles of the type described are large, expensive fixtures which are capable of performing only their designated functions. In addition to the money and floor space which must be expended to install these units, local health codes typically require that above each unit there be installed a hood or exhaust fan which draws smoke and vaporized grease from the cooking area through a vent to the outdoors.

In smaller kitchens, where it is economically or spatially impractical to install a dedicated cooking station or another hood, a cooking range or stove is utilized for a variety of cooking techniques. For example, frying can take place in a skillet or frying pan which is placed over a burner. Typically, broiling takes place within the range in an enclosed unit which has an overhead heat source. Generally, the rate at which foods can be fried or broiled on a range is significantly lower than that capable of being achieved at a dedicated cooking station, due to size limitations of frying pans and enclosed broilers. In addition, due to the overhead heat source in the broiler, foods cannot be flame-broiled or "charbroiled."

To alleviate the problem of being unable to inexpensively increase cooking capacity, or to add a flame broiler to an often limited kitchen space, portable broilers and griddles have been developed which can adapt the burners of a range into a large, flat griddle, or a flame broiler.

One such device is manufactured by Rainbow Industries and interchangeably forms a grill or griddle. The device consists of a three-sided fire box which surrounds the burners on the range top, and in which a grid on which food is broiled is formed by a plurality of parallel, spaced ½ inch angles. Grease from the broiling food drips through the spaces and down to the burners, to give the food a charbroiled flavor. Some of this grease is trapped in larger, 2-inch angles beneath the broiling grid which form the base or support structure of the fire box.

Grease trapped in these larger angles is either vaporized or manually removed upon cleaning. The broiling grid is sloped to drain off the grease that drips into the ½ inch angles and into a grease tray at the lower, front end of the broiling grid.

Food frying is achieved on the same unit by placing a large, flat griddle directly on top of the broiling grid. The flat frying surface of the griddle is surrounded on three sides by walls which contain the food on the griddle, while the front of the griddle is unenclosed to permit grease to be scraped off and into the attached grease tray.

This particular portable grill and griddle is useful for adding cooking capacity and options at a low cost, however, it suffers from several drawbacks. First, the grease which drips through the broiling grid mostly remains within the larger angles. Some of this grease burns off to leave a charred stain, which is difficult to clean, and which produces a great deal of smoke, requiring increased exhaust fan capacity. Alternatively, the grease accumulates in the enclosed angle, forming a liquid pool that is heated directly from beneath by the open flame of the burners, thus creating a fire hazard. Additionally, the pooled grease must somehow be siphoned off or otherwise manually removed after cooking. Since these units are steel and as assembled may weigh over 80 pounds, they are cumbersome and cannot easily be turned upside down to dump out the grease, or carried to a sink to be cleaned.

Secondly, since the griddle sits on top of the broiling grid, which itself is above the support angles, the transfer of heat from the burners to the frying surface of the griddle is slowed. The two layers of steel angles act as a thermal barrier which traps heated air and the burners' flame beneath it. Thus, warm-up time for the griddle is increased. Further, any grease or food which may remain on the grid or supports will burn off during frying, leaving more charred stains.

Thus, a need exists for a portable range top broiler and griddle apparatus which is easy to clean, presents no fire hazards, and heats up quickly.

SUMMARY OF THE INVENTION

Briefly stated, the invention is a portable, range top broiler and griddle apparatus having a removable and interchangeable griddle and broiling grid. The unit also includes a removable base assembly which rests beneath the grid during broiling and acts as a secondary grease drain. When in place, the base, grid, and griddle each decline toward a grease cup to automatically drain grease during cooking.

The apparatus consists of several detachable and interchangeable units. A three-sided fire box sits on the range top, surrounding the burners. When the broiler option is being used, the broiling grid is placed within the fire box, resting on supports which make the grid decline towards the front of the fire box. As food on the grid is broiled, grease automatically drains off the grid and into the grease cup which is removably attached to the front of the fire box. Preferably, the grid is formed of a series of parallel, spaced, steel channels.

Beneath the grid is a base assembly, which is similar to the grid except that the channels, and spaces between the channels, are wider. The base acts as a secondary grease drain, catching a large quantity of the grease passing through the grid. Since the base also declines toward the grease tray, grease automatically drains out of its channels. Cleanup is simplified since the grease does not pool in the base, and being removable, the base can easily be carried to a sink.

When the griddle option is in place, both the grid and base are removed from the fire box. The griddle sits on the same supports as the grid, and therefore also declines towards the grease cup. Since no heat retaining barriers are between the griddle and the burners, the griddle can be rapidly preheated, facilitating quick conversions from broiling to frying. Further, any grease or food on the grid or base does not become charred or baked on during frying, since they are not in place when the griddle is being used.

BRIEF DESCRIPTION OF THE DRAWINGS

FIG. 1 is a partially cutaway perspective view of the assembled apparatus utilizing the broiler option.

FIG. 2 is an exploded perspective view of the apparatus in the broiler option.

FIG. 3 is a cross section taken along line 3—3 in FIG. 1.

FIG. 4 is a cross section taken along line 4—4 in FIG. 1.

FIG. 5 is a perspective view of the griddle.

FIG. 6 is a perspective view of the assembled apparatus utilizing the griddle option.

DETAILED DESCRIPTION OF A PREFERRED EMBODIMENT

Referring to FIG. 2, the components common to both the broiler and griddle option are a fire box 2 and a grease cup 4. The fire box is formed by three vertical walls forming a back wall 6, two side walls 8, and an unenclosed front side 10.

Within the fire box are an upper set of support members and a lower set of support members. The set of upper supports is formed by upper rear support members or upper rods 12 and an upper front support member or upper angle 14. The set of lower supports consists of lower rods 16 and lower angle 18. The rods 12 and 16 are preferably $\frac{3}{8}$" diameter by 1" long, and are welded to the interior of both side walls, near the back wall, to protrude horizontally into the fire box. The angles 18 and 14 extend horizontally across the open front 10 of the fire box and are lower than the corresponding rods, so that the upper and lower sets of support members decline or slope downward toward the front of the box.

As depicted in FIGS. 1, 3, and 4, when food is broiled, a base 20 is removably rested on the lower supports 16, 18. Directly above the base 20 is a removable broiling grid 22 which rests on the upper supports 12, 14.

The grid 22 and base 20 have a plurality of openings through which grease can drop, and which allow heat, flame, and smoke to contact the food being broiled. The base and grid are preferably formed from a plurality of parallel, spaced channels 24 and 26, respectively. The spaces between the channels thus form the openings. The channels on both the base and grid are U-shaped, having an open top side 28 which faces upward so the channels form troughs which can collect and drain off a portion of the grease which is dripping from food being broiled. The bottoms of the channels are secured, preferably by welding, to cross members 30 and 32 which are normal to the channels, and located near the front 34 and back 36 ends of the grid and base. Attached to cross members of the grid are handles 38.

As shown in FIG. 3, the cross members 30 are L-shaped angles each having two legs, one leg which is secured to the bottom of the channels, the other leg extending downward to engage the support members so the grid or base does not slide off its respective rack. Cross member 32 is a flat bar which rests on top of support 18 and a lip 44 of the grease cup 4.

The channels are not enclosed at the front end 34 of either the grid or base. Thus, grease within any of the channels will flow off the front end of the declining channels and into the grease cup.

The grease cup consists of an elongated tray 40 enclosed on all sides except for the top 42, through which grease flowing off the channels enters the tray, and through which the grease can be dumped out of the tray. Attached to the tray is a lip 44 which hooks onto the lower, front support member 18, and is held in place by flat cross member 32. The tray is slightly wider than the lip, and is wide enough to abut the edges 46 of the side walls 8 of the fire box.

To operate the apparatus as a broiler, the base, grid, and grease cup are installed in place on the fire box. With the burners on the range turned on to a desired flame height, the food to be broiled is placed on the grid. The channels 26 of the grid have edges 48 on which the food rests while it is broiling, branding the food with charred stripes. As grease drips from the food, a substantial portion of it is captured within the channels of the grid. The grease automatically drains down to the lowered front end of the declining grid, out of the front of the enclosed channels, and into the grease cup. Of the grease which drips through the spaces between the channels of the grid, a large quantity is caught by the channels of the base.

As shown in FIG. 4, the base channels are wider and staggered relative to the channels of the grid. As on the grid, the grease drains off the front end of the declining base, and into the grease cup. Ultimately, only a small portion of grease reaches the burners, so as not to create a fire hazard or clog the orifices on the burners. As these drops of grease ignite on contact with the burner's flame, the enlarged flames and smoke "charbroil" the food.

To clean up after broiling, any remaining food particles or grease can be scraped out of the unenclosed front end of the channels and into the grease cup. The grid and base can then be separately removed from the fire box, and easily carried to a sink to be scoured and hosed down with hot water. The grease cup is also removed to dump the accumulated grease within it, and can also be scoured clean.

FIGS. 5 and 6 illustrate the griddle option of the broiler/griddle. The griddle 50 consists of a large, flat, and imperforate frying surface 52 on which food to be fried is placed. The frying surface is surrounded by three vertical walls forming a back 54 and two sides 56 which enclose the frying surface, leaving an unenclosed front end 58. Extending from the top edge of the side walls 56 are handles 60 which facilitate installing and removing the griddle.

The griddle is adapted to rest on the upper set of support members 12, 14 and therefore the frying surface declines when the griddle is in place in the fire box. Extending from the rear wall 54 are hooks 62 which engage the upper rods 12. The front end 58 of the griddle rests on the upper support member 14.

A flue 64 is formed by the space between the back wall 6 of the fire box and the back wall 54 of the griddle. The flue permits the escape of hot air from beneath the griddle during cooking.

In operation, as a griddle, the grid and base are removed from the fire box, and the griddle is installed on the upper set of supports. Once the burners are lit, the frying surface heats up rapidly, since there are no thermal barriers obstructing the heat flow from the burners to the frying surface. Foods to be fried which are initially liquid, such as pancakes, are contained on the frying surface by the surrounding walls. Excess grease automatically drains off the front end of the sloped surface, and into the grease cup. The griddle is easily cleaned by grasping it by the handles, and carrying it to a sink.

What is claimed is:

1. A portable range top cooking apparatus, comprising:
    a fire box having three vertical walls forming a back and two substantially parallel sides which are substantially normal to the back, and having an open front, top, and bottom, said fire box being adapted to be placed on top of a cooking range and surround one or more burners;
    a set of upper support members within said fire box, and a set of lower support members which is underneath said set of upper support members, said sets of support members being angled from the horizontal to decline toward the front of the fire box;
    a grid assembly on which food to be broiled is placed, the grid being removably disposed within said fire box on said upper support members, and forming a pitched broiling surface allowing grease to drain off the front of the grid assembly, said grid assembly having a plurality of openings to allow grease to drip through the grid assembly and down to the burners, and to allow heat and flame to vent through the grid assembly and to contact directly the food being grilled;
    a base assembly removably disposed on said lower support members and decling toward the front of the fire box to catch and drain off the front of the base assembly a substantial portion of the grease which drips through the grid assembly, said base assembly having a plurality of openings which allow heat and flame to pass through the base assembly and directly contact the food being broiled on the grid assembly;
    a grease cup attached to the front of the fire box and positioned to catch grease dripping off the front ends of the declining grid and assemblies; and
    a griddle which is removably interchangeable with the grid assembly on the upper support members, said griddle comprising a substantially planar and imperforate frying surface on which food is fried, said frying surface being surrounded by three vertical walls forming two substantially parallel sides and a back substantially normal to the sides, so that all drainage from the frying surface is directed off the unenclosed front of the frying surface and into the grease cup, aided by the decline imparted to the griddle by the upper support members.

2. The apparatus of claim 1, wherein when the griddle is in place on the set of upper support members, a space is defined between the back of the griddle and the back of the fire box, said space acting as a flue to vent hot air beneath the griddle.

3. The apparatus of claim 1, wherein:
    said grid and base assemblies are comprised of a plurality of substantially parallel, spaced, U-shaped channels having open top sides and enclosed bottom sides, the channels being secured to cross members so that the channels are parallel to the side walls of said fire box when either assembly is in place, the channels being arranged with the open sides facing upward, to form troughs within which the dripping grease from the broiling food is caught and drains toward the grease cup, the front end of the channels on both assemblies being unenclosed to allow grease to drain off the front end of the assemblies and into the grease cup, the spaces between the channels defining the openings through which the grease drops.

4. The apparatus of claim 3, wherein:
    the channels forming the base assembly are wider and spaced farther apart than the channels of the grid assembly, and therefore are staggered relative to the channels of the grid assembly so that the base assembly catches a substantial portion of the grease dripping through the grid assembly.

5. The apparatus of claim 1, wherein:
    each set of support members is comprised of a front and rear support member, the rear support member being a pair of axially horizontal rods extending inwardly from both side walls and proximal to the back wall of the fire box, the front support member being an L-shaped angle extending horizontally across the front of the fire box from one side wall to another, said front support member being lower than said rear support member.

6. The apparatus of claim 1, wherein said grease cup is an elongated tray which spans the width of the front of the fire box and is enclosed on all sides except the top side, through which grease enters and is removed, and said tray includes a lip which removably attaches the tray to the front support member of the set of lower support members.

* * * * *